United States Patent [19]

Allard

[11] 4,032,680

[45] June 28, 1977

[54] CONSTRUCTION MEMBER

[76] Inventor: Francois Allard, 34 Avenue Leclerc, 59 Douai, France

[22] Filed: July 14, 1975

[21] Appl. No.: 595,689

Related U.S. Application Data

[63] Continuation of Ser. No. 373,775, June 26, 1973, which is a continuation-in-part of Ser. No. 163,297, July 16, 1971, Pat. No. 3,791,912.

[30] Foreign Application Priority Data

| July 22, 1970 | France | 70.27047 |
| Jan. 15, 1971 | France | 71.01277 |
| June 27, 1972 | France | 72.23232 |

[52] U.S. Cl. ............................ 428/119; 428/125; 428/126; 428/313; 428/315; 428/322

[51] Int. Cl.² .......................................... B32B 3/26

[58] Field of Search ............ 428/53, 54, 55, 56, 428/71, 119, 192, 120, 126, 189, 313, 315, 322, 125

[56] References Cited

UNITED STATES PATENTS

| 2,850,890 | 9/1958 | Rubenstein | 52/229 |
| 3,472,728 | 10/1969 | Hitch | 428/119 |
| 3,484,331 | 12/1969 | Betz | 428/313 |
| 3,519,523 | 7/1970 | Rodman et al. | 428/322 |
| 3,709,733 | 1/1973 | Mautner | 428/119 |

*Primary Examiner*—William J. Van Balen

[57] ABSTRACT

A composite wall or panel of resin and metallic reinforcements whose core or body has a cellular structure with a surface of non-cellular hardened resin reinforced with resistant fibres, such as glass fibres, the resin of the surface layer constituting a bonding means between the metallic reinforcements and the cellular structure core.

12 Claims, 7 Drawing Figures

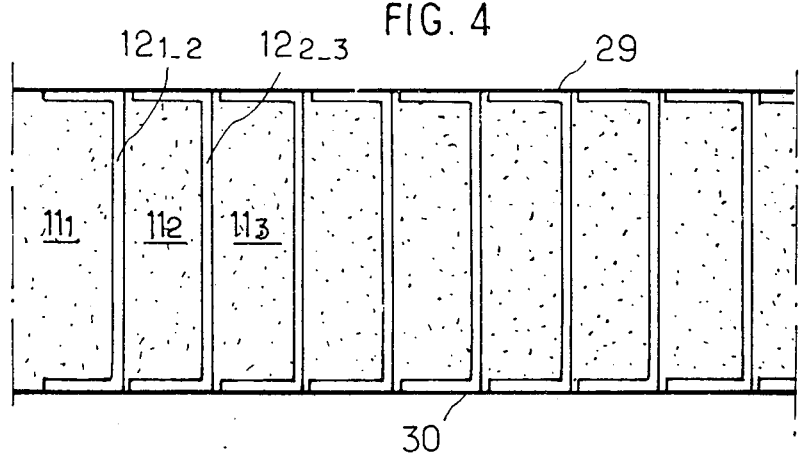
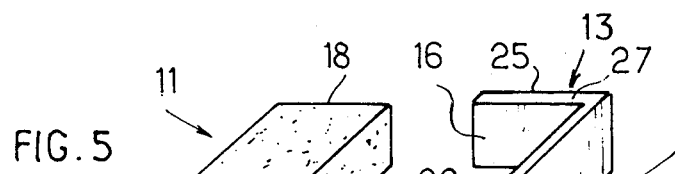
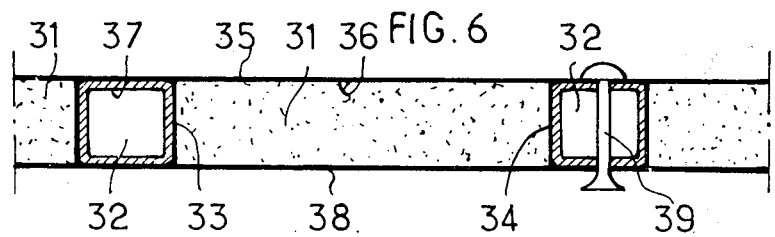
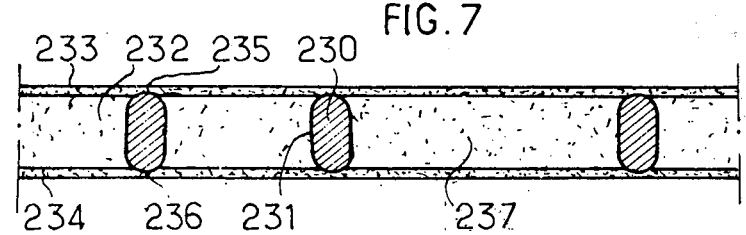

CONSTRUCTION MEMBER

This Application is a continuation of co-pending application Ser. No. 373,775 filed June 26, 1973 which in turn is a continuation in part of application Ser. No. 163,297 filed July 16, 1971 and now issued as U.S. Pat. No. 3,791,912.

My present invention relates to a composite wall or panel of resin and metallic reinforcements whose core or body has a cellular structure with a surface of noncellular hardened resin reinforced with resistant fibres, such as glass fibres, the resin of the surface layer constituting the bonding means between the metallic reinforcements and the cellular structure core;

Such a panel can be produced in various embodiments. In certain of them, the metallic reinforcements are irons such as those used in reinforced concrete and close to the surface of the panel, which are embedded in the fibre containing resin, which is itself connected to the cellular structure resin core.

In some embodiments, the metal reinforcements are close to one face of the wall and in others, metal reinforcements are adjacent to both faces of the panel.

According to the invention, in a panel, relatively thin, the same metallic reinforcement member is adjacent to both faces of the panel, bonding to the cellular structure core being obtained by means of the fibre containing resin coating the reinforcement member and also constituting the skin or surface layer of the panel on both its faces.

According to an embodiment, the metallic reinforcements are irons having an elongated or oblong cross-section whose large dimension is substantially equal to the thickness of the panel.

In one mode of execution, the metallic reinforcement members have a tubular structure.

According to other embodiments, the metallic reinforcements are flat section irons or profiles.

The invention provides thin walls or panels having an exceptionally high rigidity.

According to another mode of execution the glass fibre reinforced resin non only coats the large faces of the panel but also its edges and, according to a further mode of execution, the metallic reinforcements project in relation to the edges of the cellular structure core.

In the following description, given by way of example, reference is made to the attached drawings, wherein:

FIG. 1 is a perspective view of a portion of a panel according to the invention during its manufacture for an for an;

FIG. 4 is a view of a panel according to another embodiment, in a horizontal cross-section parallel to its large faces;

FIG. 5 is a perspective view of two components of such a panel separated from one another;

FIG. 6 is a view of a panel according to the invention for yet another embodiment, along a cross-section perpendicular to its large faces;

FIG. 7 is a view similar to FIG. 6, but for an alternative arrangement.

Figure 1:
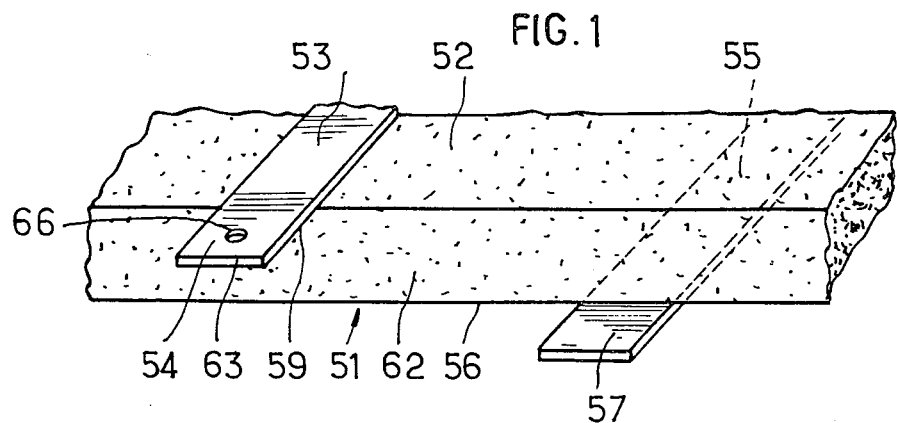
Figure 2:
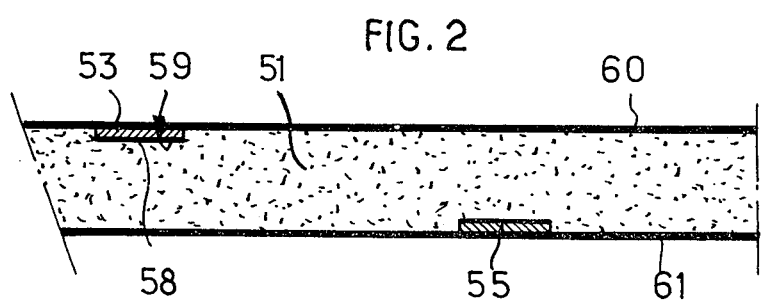
FIG. 2 is a cross-section of such a panel.

In the embodiment shown in FIGS. 1 and 2, core 51 of cellular structure resin, such as a resinous hardened foam, receives on a face 52, in a recess provided for this purpose, a flat iron 53 whose length is greater than the width of the core, the projection part being shown at 54. The next reinforcement member is a flat iron 55 applied against the other face 56 of the core, in a recess provided thereon, and which forms a projection 57 in relation thereto. The projections are present at either extremity of the flat irons 53 and 55.

The iron 53 and core 51 are connected together by a layer of fibre glass containing resin 58 interposed between the lower face 59 of the flat iron and the bottom of the recess of the core 51. Similarly, a layer of fibre glass containing resin interconnects the iron 55 and the lower face 56 of the core 51.

The unit constituted by the core 51 and the irons 53 and 55 disposed alternately on the upper and lower faces thereof is coated on both its faces with glass fibre containing resin forming layers 60 and 61 which not only gives the panel an advantageous surface resistance but also contributes to bond together the different components of the panel and ensures stress distribution.

In addition, glass fibre containing resin is packed against each of the lateral faces 62 of core 51, with respect to which irons 53 and 55 project, to a sufficient thickness to embed the end edges 63 of said irons so that the unit has a uniform aspect over its entire surface. The resin packed in this way gives the edges of the long sides of the panel high resistance properties, particularly compressive strength and impact strength.

Holes such as 66 can be provided in the projecting portions of the irons to accomodate a rivet or similar to facilitate the fastening of the panel.

In one embodiment, the flat irons have a 12 × 4 mm cross-section and are disposed at 75 mm intervals approximately. Their projection in relation to the edges of the body is approximately 10 mm beyond each edge.

Figure 3:
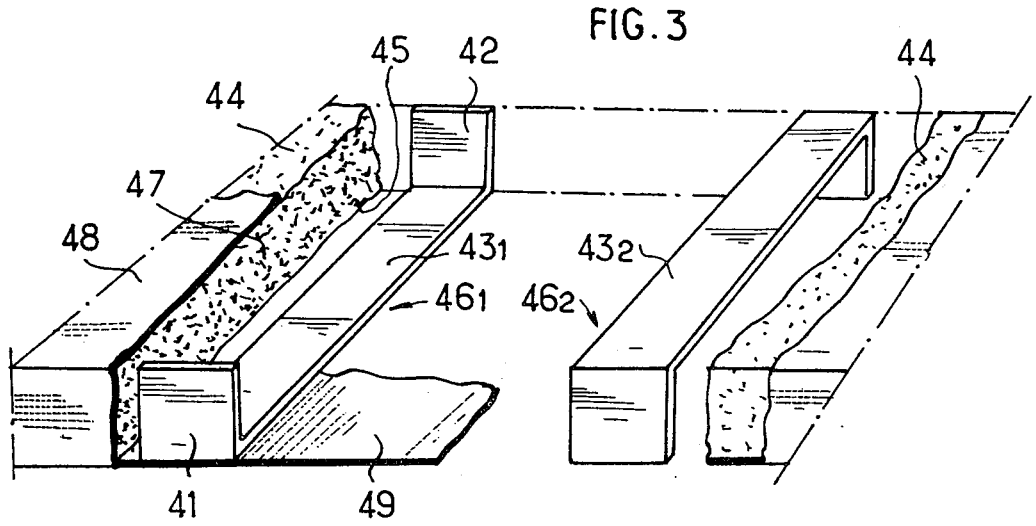
FIG. 3 is a view similar to FIG. 1, but for another embodiment.

In the embodiment represented in FIG. 3, the reinforcement members 46 are flat irons with upstanding flanges at their extremities. They thus form two arms 41 and 42 interconnected by a web or bottom 43, the latter being parallel to the large faces 44 and 45 of the panel. The reinforcement members are disposed parallel to one another with their arms 41 and 42 alternately directed upwards and downwards from the bottom 43, the bottom $43_1$ of member $46_1$ being thus adjacent to the lower face 45 of the panel while bottom $43_2$ of the next member $46_2$ is adjacent to the upper face 44 of the panel.

The core 57 of cellular material is advantageously in one piece. However, it can be constituted by a series of parallelepiped blocks.

In any case, the care is intimately bonded to the reinforcing members 46 by the glass fibre containing resin interposed between the opposite faces, on one hand, of the reinforcement members, and, on the other hand, of the block or blocks constituting the core.

The surface layers of the panel are of hardened glass fibre containing resin as diagrammatically represented at 48 and 49 which further interconnects the core and the reinforcement members.

In the embodiment shown in FIGS. 4 and 5, the panel comprises a core of with cellular structure, advantageously of expanded polyvinyl chloride. The core is formed by a series of blocks or strips $11_1$, $11_2$, $11_3$, between which are interposed metallic reinforcements $12_1$, $12_2$, $12_3$ etc. Each reinforcement 12 is generally U-shaped having two parallel arms 13 and 14 interconnected by a bottom 15. The inner opposite face 16 and 17 of arms 13 and 14 are at a distance slightly greater than the distance between faces 18 and 19 of parallelepiped strps 11 and the width of said strips is substantially equal to the length of the internal faces 16 and 17, so that the interposition of a layer 21 of resin between faces 18 and 19 of the strip and the internal faces 16 and 17, and between the internal face 22 of bottom 15 and of a large face 23 of strip 11, ensures the bonding between said strip or parallelepiped block 11 and the metallic reinforcement member 12. A layer of resin is also interposed between the outer face 15' of bottom 15 and the adjacent face 23' of block 11. The holding resin which is of the same type as that constituting the core, is not expanded. It is advantageously reinforced with fibres such as glass fibres.

The outer surface or skin of the wall, or panel, is a layer of non, expanded hardened glass fibre containing resin, as shown at 29 and 30.

The entire surface of the flat panel thus obtained has a uniform and smooth appearance. It is exceptionally strong owing to the metallic reinforcements and their bonding to the cellular core obtained by means of the fibre containing resin. The long edges of the panel have the external faces 25 and 26 of arms 13 and 14 of the metallic reinforcement members immediately underlying their surface. Edges 27 and 28 of said arms provide substantially continuous alignment.

In one mode of execution, the strips are between 75 and 150 mm wide and 10 mm thick on an average. The metallic reinforcements have a rectangular or oblong 4 × 10 mm cross-section.

In the embodiment shown in FIG. 6, the core includes a series of flat parallelepiped blocks 31 with a cellular structure between which are interposed steel reinforcement members 32 which are tubular, and have a square cross-section in the shown embodiment. A block 31 and adjacent reinforcements 32 are interconnected by glass fibre containing resin layers 33 and 34. A glass fibre containing resin layer 35 is applied against the large faces 36 of the blocks 31 as well as against faces 37 of the reinforcement elements, flush with face 36, and thus ensures that the stresses are distributed between all the constituents of the panel, layer 35 being connected to layers 33 and 34 and the latter to layer 38 of the opposite face.

Attachment members can be provided on the panel at right angles to the metallic reinforcements, for examples rivets 39 passing through a member 32.

In another mode of execution, 75 to 150 mm wide and approximately 10 to 15 mm thick parallelepiped blocks are used. The steel tubes then have a square cross-section of 10 to 15 mm, depending on the case, with a thickness of 1 to 1.5 mm.

With reference now to FIG. 7, irons with an elongated, rectangular or oblong cross-section as represented at 230 and comprising a helical rib 231 are in contact with both the outer coating or skins 233 and 234 of the member at their opposite apex zones 235 and 236. The body or core 237 of the member is of expanded polyvinyl chloride. The resin, advantageously polyester or formophenol, of the glass fibre resin composite constituting the skins ensures that it is integral both with the body 237 and the irons 230.

Such a panel is particularly strong, although thin.

It is advantageously used in container construction.

Generally speaking, the invention provides very rigid 10 to 12 mm thick walls or panels whose length can be as much as or exceeding 12 mm and whose width can be as much as and exceed 2.5 m.

I claim:
1. A flat construction element comprising a core of expanded resin foam material having opposite surfaces, a plurality of parallel metallic members regularly distributed in said core, said members each having a height equal to the thickness of said core, a cover layer on each of the surfaces of said core, each said cover layer being constituted of hardened resin in contact with the associated surface of the core and with said metallic members along the external surface thereof, and a layer of hardened resin interposed between the metallic members and said core.

2. A construction element as claimed in claim 1 wherein the core is rectangular and the metallic members are of U-shape with a bottom adjacent a large surface of the core and arms adjacent smaller edges of the core, a further cover layer covering said edges and the arms, the arms having extremities which are covered by the cover layers applied on the larger surface of the core opposite the one adjacent said bottom of the U-shape member.

3. A construction element as claimed in claim 2 wherein two successive metallic members have their arms adjacent opposed large surfaces of the core.

4. A construction element as claimed in claim 2 wherein the core is rectangular and the metallic members are of U shape with arms adjacent the smaller faces of the core and a bottom perpendicular to said arm, the resin layer being in cooperative contact with the external surfaces of the arms and the edges thereof adjacent the larger surfaces.

5. A flat element comprising expanded resin foam core of material having little resistance to compression comprising a plurality of core portions disposed in spaced relation parallel to one another in a substantially planar configuration, a plurality of elongated reinforcement bars disposed in the spaces between adjacent core portions and filling the same, said reinforcement bars having transverse faces not facing the edges of the core portions and longitudinal faces facing said edges of the core portions, said transverse edges being substantially at the same level as the opposed faces of the core portions, and a layer of hard resin reinforced with glass fibers covering with continuity the opposed faces of the core portions, the said transverse faces of the reinforcement bars, the said longitudinal faces of the reinforcement bars and also the longitudinal faces of the core portions, thus adhering the said bars with said core portions of the core and forming a hard, continuous skin on the external faces of the element.

6. A flat element according to claim 5 in which the metallic bars are tubular and have a rectangular transverse section.

7. A flat element according to claim 5 in which the bars are solid and have junction faces with the core portions which are substantially planar.

8. A construction element as claimed in claim 4 wherein the core is constituted by a plurality of blocks each of which is engaged in the space between the arms of corresponding U-shaped metallic member.

9. A construction element as claimed in claim 1 in which the metallic member is tubular.

10. A construction element as claimed in claim 9 in which the tubular member has a rectangular section.

11. A construction element as claimed in claim 1 in which the metallic member is solid.

12. A construction element as claimed in claim 1 in which the metallic member has an oblong section.

* * * * *